United States Patent
Huber

(10) Patent No.: US 11,434,954 B2
(45) Date of Patent: Sep. 6, 2022

(54) ROTATIONAL BEARING ARRANGEMENT FOR A STEERING COLUMN OF A MOTOR VEHICLE

(71) Applicants: THYSSENKRUPP PRESTA AG, Eschen (LI); thyssenkrupp AG, Essen (DE)

(72) Inventor: Sebastian Huber, Göfis (AT)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 707 days.

(21) Appl. No.: 16/323,316

(22) PCT Filed: Aug. 3, 2017

(86) PCT No.: PCT/EP2017/069658
§ 371 (c)(1),
(2) Date: Feb. 5, 2019

(87) PCT Pub. No.: WO2018/029075
PCT Pub. Date: Feb. 15, 2018

(65) Prior Publication Data
US 2021/0293273 A1    Sep. 23, 2021

(30) Foreign Application Priority Data

Aug. 8, 2016  (DE) .................... 10 2016 114 678.1

(51) Int. Cl.
*F16C 27/06* (2006.01)
*B62D 1/16* (2006.01)
(52) U.S. Cl.
CPC .............. *F16C 27/063* (2013.01); *B62D 1/16* (2013.01); *F16C 2326/24* (2013.01)

(58) Field of Classification Search
CPC .... F16C 25/02; F16C 27/063; F16C 2326/24; F16C 23/043; F16C 17/26; F16C 17/02;
(Continued)

(56) References Cited

U.S. PATENT DOCUMENTS 2,164,497 A * 7/1939 Chamberlin .......... F16C 25/083
                                                    384/518
2,744,419 A * 5/1956 Chayne .................. B62D 1/185
                                                    74/493

(Continued)

FOREIGN PATENT DOCUMENTS

CN          203345014 U      12/2013
CN          105263784 A      1/2016
(Continued)

OTHER PUBLICATIONS

English Translation of International Search Report issued in PCT/EP2017/069658, dated Oct. 12, 2017.

*Primary Examiner* — Paul N Dickson
*Assistant Examiner* — Timothy Wilhelm
(74) *Attorney, Agent, or Firm* — thyssenkrupp North America, LLC

(57) ABSTRACT

A pivot bearing arrangement for a steering column of a motor vehicle, having a steering shaft which is rotatably mounted in a casing unit in the direction of its axis of rotation but rigidly mounted in the radial direction, is improved in terms of a simple and cost-effective construction in that the casing unit is provided with at least one first sliding bearing shell, which comprises a first circumferential radial projection, which engages in a first circumferential groove.

4 Claims, 2 Drawing Sheets

(58) Field of Classification Search
CPC .. F16C 33/20; B62D 1/16; B62D 1/18; B62D 1/185; B62D 1/19
See application file for complete search history.

(56) References Cited

U.S. PATENT DOCUMENTS

| | | | | |
|---|---|---|---|---|
| 3,670,592 A * | 6/1972 | Senft | ............... | B62D 1/16 74/493 |
| 3,771,846 A * | 11/1973 | Bass | ............... | F16C 33/20 384/125 |
| 3,962,931 A * | 6/1976 | Moneta | ............... | B62D 1/184 74/493 |
| 4,044,977 A * | 8/1977 | Feucht | ............... | F16C 27/063 267/141.3 |
| 4,185,837 A * | 1/1980 | Greene | ............... | F16C 27/063 277/400 |
| 4,254,614 A * | 3/1981 | Miyamoto | ............... | D01H 4/12 384/227 |
| 4,277,984 A * | 7/1981 | Numazawa | ............... | B62D 1/16 384/542 |
| 4,384,861 A * | 5/1983 | Lange | ............... | F16C 3/035 464/168 |
| 4,406,176 A * | 9/1983 | Numazawa | ............... | B62D 1/16 280/779 |
| 4,523,864 A * | 6/1985 | Walter | ............... | F16C 19/54 384/513 |
| 4,541,742 A * | 9/1985 | Lederman | ............... | B62D 1/16 384/518 |
| 4,708,499 A * | 11/1987 | Loser | ............... | F16C 23/084 384/484 |
| 4,732,495 A * | 3/1988 | Brandenstein | ............... | F16C 25/083 384/518 |
| 4,750,847 A * | 6/1988 | Boyd | ............... | F16C 17/02 384/140 |
| 4,828,403 A * | 5/1989 | Schwartzman | ............... | F16C 17/10 384/100 |
| 4,913,564 A * | 4/1990 | Stephan | ............... | F16C 19/16 384/511 |
| 4,979,834 A * | 12/1990 | Speich | ............... | F16C 25/08 384/510 |
| 5,143,456 A * | 9/1992 | Jordens | ............... | B60G 7/00 384/275 |
| 5,193,917 A * | 3/1993 | Adler | ............... | F16C 25/083 384/517 |
| 5,267,480 A * | 12/1993 | Krizan | ............... | B62D 1/185 29/517 |
| 5,316,393 A * | 5/1994 | Daugherty | ............... | F16C 25/083 384/517 |
| 5,413,417 A * | 5/1995 | Labedan | ............... | B62D 1/192 280/777 |
| 5,531,526 A * | 7/1996 | Labedan | ............... | B62D 1/16 384/518 |
| 5,540,420 A * | 7/1996 | Luzsicza | ............... | F16C 27/063 267/141.1 |
| 5,609,423 A * | 3/1997 | Jurik | ............... | B62D 1/16 384/518 |
| 5,669,718 A * | 9/1997 | Sakairi | ............... | B62D 1/16 384/220 |
| 5,722,300 A * | 3/1998 | Burkhard | ............... | B62D 1/185 280/775 |
| 5,829,891 A * | 11/1998 | Beaman | ............... | F16C 25/083 384/495 |
| 5,975,766 A * | 11/1999 | Cau | ............... | F16C 35/073 384/538 |
| 6,106,156 A * | 8/2000 | Niebling | ............... | F16C 33/723 384/538 |
| 6,227,715 B1 * | 5/2001 | Erhardt | ............... | B62D 1/16 384/518 |
| 6,343,993 B1 * | 2/2002 | Duval | ............... | B62D 1/16 384/49 |
| 6,419,397 B1 * | 7/2002 | Beaman | ............... | B62D 1/16 384/520 |
| 6,510,756 B2 * | 1/2003 | Aota | ............... | B62D 1/192 280/777 |
| 6,513,984 B1 * | 2/2003 | Hobaugh, II | ............... | B62D 1/16 384/537 |
| 6,913,391 B2 * | 7/2005 | Weisskopf | ............... | B62D 1/16 384/536 |
| 6,964,211 B1 * | 11/2005 | St. Myer | ............... | B62D 1/16 280/779 |
| 7,341,525 B2 * | 3/2008 | Zernickel | ............... | F16C 3/035 384/49 |
| 7,370,724 B2 * | 5/2008 | Saito | ............... | B62D 1/16 180/444 |
| 7,380,828 B2 * | 6/2008 | Menjak | ............... | B62D 1/02 280/779 |
| 7,429,134 B2 * | 9/2008 | Brandenstein | ............... | F16C 35/073 384/538 |
| 7,604,414 B2 * | 10/2009 | Verhoeven | ............... | F16C 25/083 384/517 |
| 7,717,462 B2 * | 5/2010 | Liu | ............... | F16C 25/08 280/775 |
| 8,429,991 B2 * | 4/2013 | Kim | ............... | F16C 27/063 74/89.17 |
| 8,616,580 B2 * | 12/2013 | Maniwa | ............... | F16C 1/226 280/779 |
| 8,764,063 B2 * | 7/2014 | Jouta | ............... | B62D 1/192 280/775 |
| 8,997,601 B2 * | 4/2015 | Erhardt | ............... | F16C 19/548 74/492 |
| 9,068,590 B2 * | 6/2015 | Bussit | ............... | F16C 19/163 |
| 9,126,622 B2 * | 9/2015 | Hebenstreit | ............... | F16D 1/0876 |
| 9,127,711 B2 * | 9/2015 | Bussit | ............... | B62D 1/16 |
| 9,403,210 B2 * | 8/2016 | Nagasawa | ............... | B22D 19/16 |
| 9,415,799 B2 * | 8/2016 | Yoshikawa | ............... | B62D 5/04 |
| 9,422,980 B2 * | 8/2016 | Bussit | ............... | B62D 1/16 |
| 9,435,373 B2 * | 9/2016 | Boufflert | ............... | F16C 19/06 |
| 9,566,996 B2 * | 2/2017 | Wilkes | ............... | F16D 3/065 |
| 9,573,621 B2 * | 2/2017 | Shiraishi | ............... | G01L 5/221 |
| 9,656,685 B2 * | 5/2017 | Iwakawa | ............... | B62D 3/12 |
| 9,663,137 B2 * | 5/2017 | Mizutani | ............... | B62D 3/123 |
| 9,845,106 B2 * | 12/2017 | Bodtker | ............... | B62D 1/16 |
| 9,863,469 B2 * | 1/2018 | Shimizu | ............... | F16C 19/385 |
| 9,869,136 B2 * | 1/2018 | Gharib | ............... | E21B 17/006 |
| 9,945,420 B2 * | 4/2018 | Dupuis | ............... | B62D 1/16 |
| 9,995,337 B2 * | 6/2018 | Ikeda | ............... | B62D 1/20 |
| 10,005,490 B2 * | 6/2018 | Unno | ............... | B62D 6/10 |
| 10,137,925 B2 * | 11/2018 | Appleyard | ............... | B62D 1/185 |
| 10,378,577 B2 * | 8/2019 | Wilkes | ............... | F16C 33/46 |
| 10,634,184 B2 * | 4/2020 | Muntener | ............... | B21H 1/20 |
| 2001/0040326 A1 * | 11/2001 | Balczun | ............... | F16C 11/083 267/141 |
| 2003/0154815 A1 * | 8/2003 | Heiml | ............... | B62D 1/16 74/492 |
| 2004/0076353 A1 * | 4/2004 | Kubota | ............... | F16C 33/20 384/276 |
| 2005/0200111 A1 * | 9/2005 | Cymbal | ............... | B62D 1/185 280/775 |
| 2007/0126222 A1 * | 6/2007 | Koya | ............... | B62D 1/185 280/775 |
| 2011/0169361 A1 * | 7/2011 | Park | ............... | F16C 17/02 310/91 |
| 2012/0193901 A1 * | 8/2012 | Jouta | ............... | B62D 7/224 280/775 |
| 2013/0199866 A1 * | 8/2013 | Yamamoto | ............... | B62D 1/184 180/443 |
| 2015/0017000 A1 * | 1/2015 | Sato | ............... | F16C 33/103 416/174 |
| 2016/0052536 A1 | 2/2016 | Nicolussi | | |
| 2016/0214636 A1 * | 7/2016 | Watanabe | ............... | B62D 1/185 |
| 2016/0377118 A1 * | 12/2016 | Schultz | ............... | F16F 1/403 384/221 |
| 2017/0106894 A1 * | 4/2017 | Bodtker | ............... | B62D 1/06 |
| 2017/0350493 A1 * | 12/2017 | Lamson | ............... | F16H 25/24 |
| 2018/0370317 A1 * | 12/2018 | Takahashi | ............... | B60G 15/06 |

(56) References Cited

U.S. PATENT DOCUMENTS

2020/0223473 A1\* 7/2020 Soderlind ................. F16D 3/06
2020/0282941 A1\* 9/2020 Ross ..................... B60R 21/206

FOREIGN PATENT DOCUMENTS

| DE | 40 13 655 C | 10/1990 |
|----|----|----|
| DE | 691 01 303 T | 10/1994 |
| DE | 101 50 616 C | 2/2003 |
| DE | 10 2006 012 057 A | 9/2007 |
| DE | 10 2012 105 151 B | 7/2013 |
| JP | S5836760 A | 3/1983 |
| JP | 2014 141225 A | 8/2014 |

\* cited by examiner

ROTATIONAL BEARING ARRANGEMENT FOR A STEERING COLUMN OF A MOTOR VEHICLE

CROSS REFERENCE TO RELATED APPLICATIONS

This application is a U.S. National Stage Entry of International Patent Application Serial Number PCT/EP2017/069658, filed Aug. 3, 2017, which claims priority to German Patent Application No. DE 10 2016 114 678.1, filed Aug. 8, 2016, the entire contents of both of which are incorporated herein by reference.

FIELD

The present disclosure generally relates to a pivot bearing arrangement for a steering column of a motor vehicle.

BACKGROUND

Such a pivot bearing arrangement is known from DE69101303T2. There, the mounting for a steering shaft of a steering column is designed as sliding bearing mounting. Disadvantageous in this solution is that the mounting of the steering shaft is designed non-rigidly in the axial direction and has a complex structure.

Thus a need exists for a pivot bearing arrangement that is easy to assemble and has a simple construction with few components.

DETAILED DESCRIPTION

Figure 1:
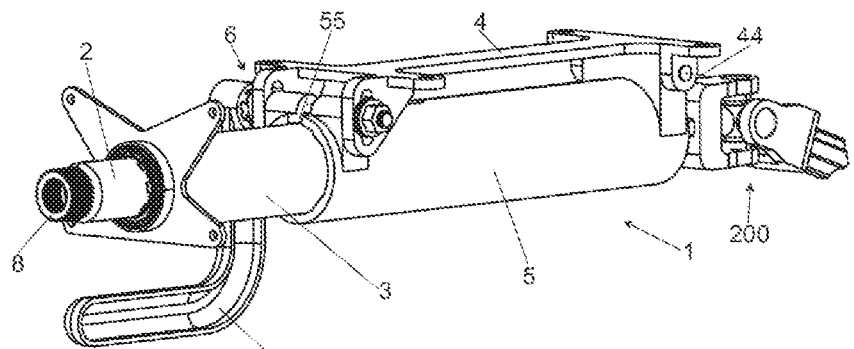
FIG. 1 is a perspective view of a steering column with rigid casing unit and rotatable steering shaft.
Figure 2:
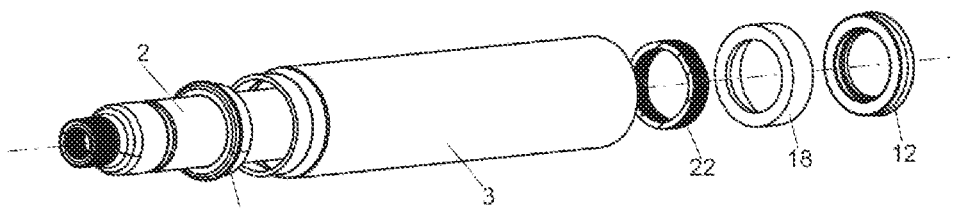
FIG. 2 is an exploded view of a pivot bearing arrangement of a rotatable steering shaft in a casing unit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a pivot bearing arrangement for a steering column of a motor vehicle, having a steering shaft, which is rotatably mounted about its axis of rotation in a casing unit.

The solution as claimed in the invention consists in that the casing unit is provided with at least one first sliding bearing shell, which comprises a first circumferential radial projection, which engages in a first circumferential groove of the steering shaft. By configuring the steering shaft with the circumferential groove, the pivot bearing arrangement as claimed in the invention manages to make do with a single sliding bearing shell for each bearing. Here, the function of the sliding bearing shell located opposite is replaced by the groove of the steering shaft. This is why the construction and the assembly are possible in a particularly simple manner.

Since for the rotatable mounting of the steering shaft two pivot bearings are generally required, an embodiment of a second pivot bearing as claimed in the invention is recommended, in which the casing unit is provided with a second sliding bearing shell, which is arranged axially spaced from the first sliding bearing shell and comprises a second circumferential radial projection, which engages in a second circumferential groove of the steering shaft. The same advantages as for the first pivot bearing are obtained for the second pivot bearing.

In an advantageous embodiment of the invention it is recommended that the first sliding bearing shell is connected to an end section of the casing unit by press fit and the associated first circumferential groove is arranged in an end region of the steering shaft, which is intended for fastening a steering wheel. Through the press fit, the first sliding bearing shell is immovably firmly connected to the casing unit so that it is able to fix the rotatable steering shaft both in the axial direction and in the radial direction. The configuration of a press fit is particularly simple and requires no additional fastening means.

A further advantageous embodiment of the invention provides that on the casing unit, adjacent to the second sliding bearing shell, a bearing ring with a bearing section projecting towards the inside is fastened, that a radially outer side of the second sliding bearing shell lies against the casing unit with a sliding fit and that between the bearing section of the bearing ring and an axial lateral face of the second sliding bearing shell a compression spring is arranged, which preloads the second sliding bearing shell relative to the first sliding bearing shell rigidly fastened to the casing unit in the axial direction. Through the mentioned preload, play in the two pivot bearings is avoided.

In a first version of the described configuration the bearing ring can be arranged on the axial side of the second sliding bearing shell facing the first sliding bearing shell, so that the compression spring pushes the two sliding bearing shells axially apart.

In a second version of the described embodiment it is provided that the bearing ring is arranged on the axial side of the second sliding bearing shell facing away from the first sliding bearing shell, so that the compression spring presses the two sliding bearing shells axially towards one another. In both versions, the bearing play is effectively eliminated.

A further embodiment of the invention, in which the compression spring is a disk spring, coil spring or a wave spring, has the advantage that the compression spring can be accommodated in a relatively narrow annular region between the bearing ring of the casing unit and the steering shaft and nevertheless provides a substantial preload force.

As a further advantageous embodiment of the invention it is recommended that the first sliding bearing shell and/or the second sliding bearing shell consist/consists of plastic. The plastic material is hard enough in order to transmit the forces emanating from the fixed steering shaft to the casing unit and yet elastic enough in order to make possible minor deformations of the sliding bearing shells during the assembly of the steering column.

Preferably, the plastic is a polyoxymethylene (POM) or a polyamide (PA). In experiments it has been shown that these plastics are particularly suitable for fulfilling the requirements regarding rigidity in the axial direction, wear characteristics and friction characteristics.

Preferably, the sliding bearing shell can comprise a friction-reducing substance or be provided with such, for example molybdenum disulfide, graphite or polytetrafluoroethylene. These friction-reducing substances can also be referred to as lubricants. These do not only serve for reducing the friction during the rotation of the steering shaft but also for reducing the differential between the adhesive friction and sliding friction, so that a jerky breakaway during the initiation of a steering movement is reduced. The jerky breakaway constitutes a force peak or moment peak required to be overcome in order to put the steering shaft into rotary motion.

As claimed in a further advantageous configuration of the invention, the first circumferential groove and/or the second circumferential groove are/is molded into the steering shaft by rolling. This measure is particularly easily and cost-effectively realizable.

For assembling the first sliding bearing shell and the second sliding bearing shell on the steering shaft it is provided that the sliding bearing shells are slid onto the steering shaft until the same engage in the corresponding groove. Because of the great elasticity of the sliding bearing shells made of plastic, the same can be slid onto the steering shaft without additional measures.

Obviously, the invention also includes embodiments in which the configuration of the steering shaft and the configuration of the casing unit in terms of the arrangement of first and second groove, fastening of first and second sliding bearing shell and bearing ring are swapped and the configuration of the bearing ring and of the first and second sliding bearing shell are functionally matched. In particular, the first sliding bearing shell or the second sliding bearing shell and if required the bearing ring could be fastened on the steering shaft, wherein the circumferential grooves would be molded into the casing unit. Correspondingly, the sliding bearing shells would have circumferential projections which radially project to the outside. Also possible is an embodiment in which the first sliding bearing is configured as in the thoroughly described first embodiment and only the second sliding bearing is configured as claimed in the second embodiment or vice versa.

A section of a steering column 1 of a motor vehicle is evident in FIG. 1. A steering shaft 2 is rotatably mounted in the interior of a casing unit 3. The casing unit 3 is firmly connectable to the chassis of a motor vehicle, which is not shown, by means of a support 4. A clamping tube 5 is pivotably connected about a pivot axis 44 with the support 4 designed as console, the clamping tube 5 having a longitudinal slit 55 on the top side. Furthermore, a clamping device 6 is arranged on the support 4, which can be clamped or opened by means of an actuaton lever 7. When the actuation lever 7 is moved in the clamping direction the clamping device 6 causes an elastic deformation of the clamping tube 5, the mentioned longitudinal slit becoming smaller (narrower) and the casing unit 3 arranged in the clamping tube 5 being clamped tight, so that it is rigidly connected to the support 4. An end region 8 of the steering shaft 2 projecting from the casing unit 3 is provided with a positive connection profile designed as external splines and is intended for receiving a steering wheel that is not shown. The steering shaft 2 is connected to a universal joint 200. As is best evident in the FIGS. 3 to 6, the steering shaft 2 is rotatably mounted in the casing unit 3 by means of a first sliding bearing 9 and a second sliding bearing 10.

The first sliding bearing 9 consists of a first sliding bearing shell 11 made of plastic, which is connected to an end section 13 of the casing unit 3 by press fit. Furthermore, the first sliding bearing shell 11 comprises a circumferential first radial projection 14, which engages in a first circumferential groove 15 of the steering shaft 2. The first circumferential groove 15 is arranged in the end region 8 of the steering shaft 2, which is intended for fastening a steering wheel.

Accordingly, the second sliding bearing 10 has a second sliding bearing shell 12 which, axially spaced from the first sliding bearing shell 11, is arranged with sliding fit on the casing unit 3. The second sliding bearing shell 12 has a second circumferential radial projection 16 which engages in a second circumferential groove 17 of the steering shaft 2.

Figure 3:
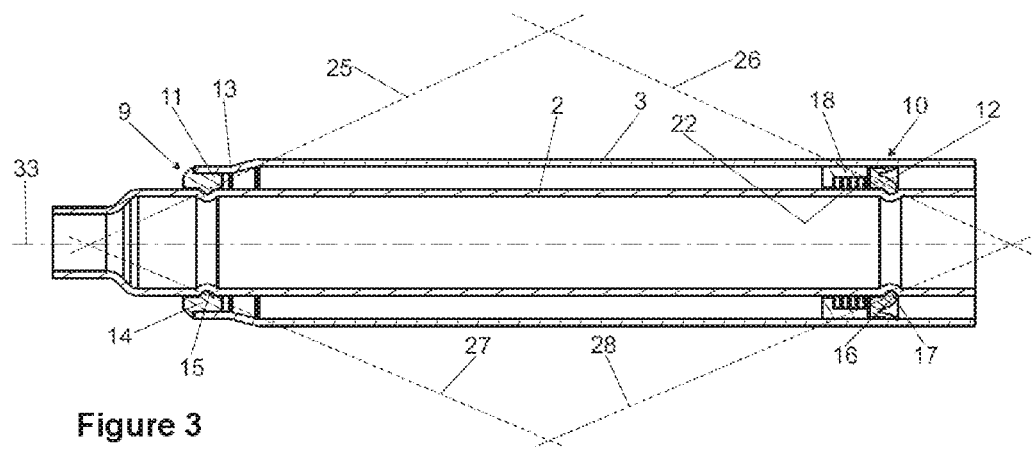
FIG. 3 is a sectional view through a casing unit and steering shaft with the pivot bearing arrangement in a first embodiment.
Figure 4:
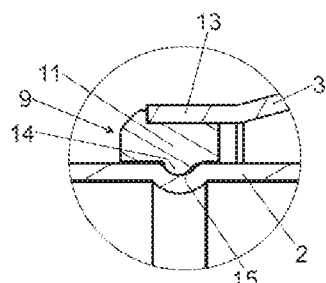
FIG. 4 is an enlarged detailed view from FIG. 3 of the region of the first pivot bearing.
Figure 5:
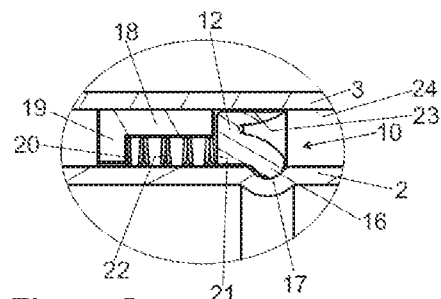
FIG. 5 is an enlarged detailed view from FIG. 3 of the second pivot bearing.

Furthermore, a circumferential bearing ring 18 is fastened on the casing unit 3, adjacent to the second sliding bearing shell 12, which bearing ring 18 has a circumferential bearing section 19 projecting towards the inside. Between an inner axial face 20 of the bearing section 19 and an axial lateral face 21 of the second sliding bearing shell 12 located opposite, a compression spring 22 is arranged which supports itself on the inner axial face 20 of the bearing section 19 and attempts to shift the second sliding bearing shell 12 to the right in the axial direction relative to the casing unit 3. The second sliding bearing shell 12 however is supported by its second radial projection 16 in the second circumferential groove 17 of the steering shaft 2 namely both in the radial direction and in the axial direction. For this reason, the preload of the compression spring 22 in the axial direction causes the second sliding bearing shell 12 to attempt to shift the steering shaft 2 to the right in the axial direction (see FIGS. 5 and 3). This is possible because the radial outside 23 of the second sliding bearing shell 12 forms a sliding fit with the inner wall face 24 of the casing unit 3 and can be shifted relative to the casing unit 3 in the axial direction by strong forces. As a reaction to this, a preload materializes on the first sliding bearing 9 since the first sliding bearing shell 11 is connected to the casing unit 3 by a firm press fit and is not shiftable relative to the casing unit 3. However, the compression spring 22 causes the steering shaft 2 to shift to the left in the axial direction while the casing unit 3 pulls to the right. This causes the first sliding bearing shell 11 to be preloaded relative to the first circumferential groove 15 of the steering shaft 2. Because of the sloping flanks of the circumferential grooves 15, 17, the preload in the axial direction also causes a preload in the radial direction so that the resulting preload force is also oriented obliquely, i.e. at an angle to the longitudinal axis 33. The dashed lines 25 to 28 in FIG. 3 are oriented in the direction of the resulting preload forces. The lines 25 and 27 and 26 and 28 respectively intersect outside the first and second sliding bearing shells 11, 12, i.e. the points of intersection of the lines 25 and 27 and 26 and 28 respectively are not located between the sliding bearing shells 11, 12 but on the respective side of the sliding bearing shell facing away from the other sliding bearing shell. Such a bearing arrangement as is shown in the FIGS. 3 to 5 is also referred to as O-arrangement. Such a bearing arrangement offers the advantage that axial loads are absorbed in both axial directions, but in each case only by one bearing or bearing set, which produces a rigid mounting. Thanks to the large distance between the effective bearing centers (intersection point of the lines 25 and 27 and 26 and 28 respectively), this arrangement is particularly well suited for absorbing moment loads acting on the steering shaft, for example in the case of a vehicle head-on collision. During a vehicle head-on collision, a bending moment is introduced into the steering shaft by the vehicle driver striking the steering wheel.

In the embodiment described above, the bearing ring 18 is arranged between the first sliding bearing shell 11 and the second sliding bearing shell, i.e. in the inner region. Here, the two sliding bearing shells 11, 12 are axially pressed to the outside, namely the first sliding bearing shell 11 to the left and the second sliding bearing shell 12 to the right.

Figure 6:
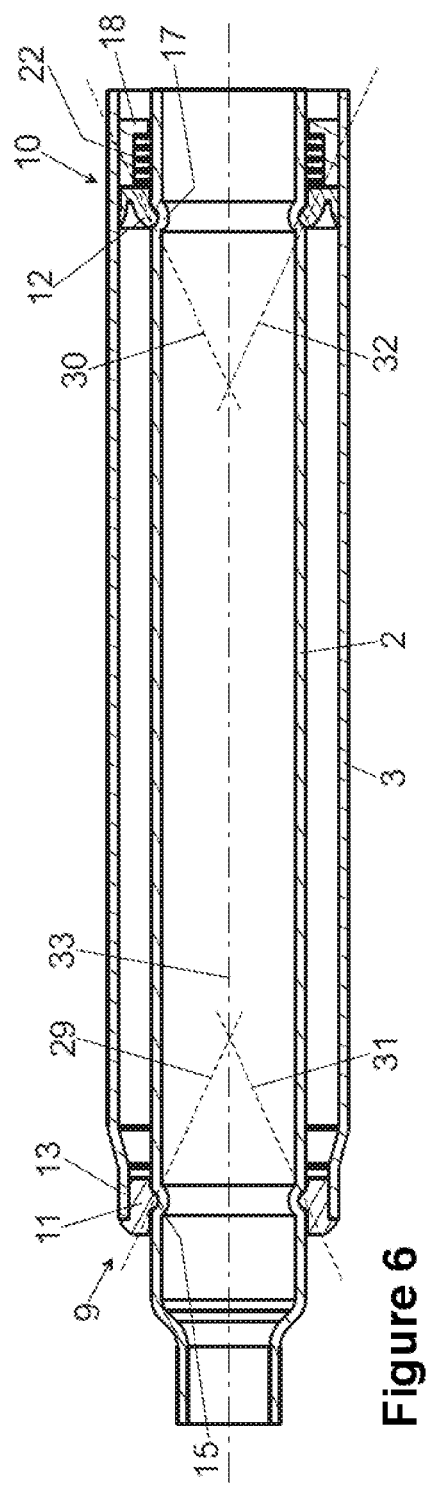
FIG. 6 is a sectional view of FIG. 3, however of a second embodiment.

However, in a second embodiment of the invention shown in FIG. 6, the bearing ring 18 is arranged on the axial side of the second sliding bearing shell 12 facing away from the first sliding bearing shell 11, and is thus located outside the interior space delimited by the two sliding bearing shells 11, 12. This has the consequence that the second sliding bearing shell 12 is pushed to the left and in the process drives the steering shaft 2, so that the first sliding bearing shell 11 lies against the right flank of the first circumferential groove 15. Thus, the two sliding bearing shells 11, 12 are pushed towards one another. This has repercussions on the resulting forces between the sliding bearing shells 11, 12 and the circumferential grooves 15, 17. As is evident in FIG. 6, the dashed lines 29 to 32 oriented in the force direction run differently from the dashed lines 25 to 28 from FIG. 3, for the dashed lines 29 and 31 and the line 30 and 32 intersect between the sliding bearing shells 11, 12. This bearing arrangement is referred to as X-arrangement.

In the present exemplary embodiment, the compression spring 22 is designed as a disk spring stack. However, a wave spring can also be used. The sliding bearing shells 11, 12 consist of plastic. The bearing ring 18 is produced from metal. The circumferential grooves 15, 17 were molded into the steering shaft 2 by rolling. The two sliding bearings 9, 10 thus consist of the sliding bearing shells 11, 12 and the circumferential grooves 15, 17 molded into the steering shaft 2 by rolling. The production is therefore particularly simple and cost-effective. The device for the axial preload is also constructed particularly simply. It merely consists of the bearing ring 18 and the compression spring 22. The bearing ring 18 and the inner diameter of the casing unit 3 have an interference fit, i.e. the bearing ring 18 is received in the casing unit 3 after the assembly by means of a press fit and constitutes a counter bearing for the compression spring 22.

Obviously, the invention includes embodiments in which the grooves are molded into the casing unit 3 and the sliding bearing shells are fastened to the steering shaft 2. The bearing ring can likewise also be fastened to the steering shaft 2 instead of the casing unit 3.

For assembling the pivot bearing arrangement as claimed in the invention, the first sliding bearing shell 11 is slid over the steering wheel-side end region 8 of the steering shaft 2, wherein the sliding bearing shell 11 consisting of plastic expands elastically and thereafter snaps into the first circumferential groove 15. Following this, the assembly consisting of steering shaft 2 and first sliding bearing shell 11 is pressed into the tube of the casing unit 3, wherein the first sliding bearing shell 11 is firmly connected to the end section 13 of the casing unit 3 by press fit. Following this, the assembly consisting of bearing ring 18, compression spring 22 and second sliding bearing shell 12 is slid into the annular intermediate space between the steering shaft 2 and the casing unit 3 until the second radial projection 16 of the second sliding bearing shell 12 snaps into the second circumferential groove 17 of the steering shaft 2.

LIST OF REFERENCE NUMBERS

1 Steering column
2 Steering shaft
3 Casing unit
4 Support
5 Clamping tube
6 Clamping device
7 Actuation lever
8 End region
9 First sliding bearing
10 Second sliding bearing
11 First sliding bearing shell
12 Second sliding bearing shell
13 End section
14 First radial projection
15 First circumferential groove
16 Second radial projection
17 Second circumferential groove
18 Bearing ring
19 Bearing section
20 Inner axial face
21 Axial lateral face
22 Compression spring
23. Radial outside
24 Inner wall face
25 to 32 Dashed line
33 Axis of rotation

What is claimed is:

1. A pivot bearing arrangement for a steering column of a motor vehicle, comprising:
    a casing unit;
    a steering shaft including a first circumferential groove, the steering shaft rotatably mounted in the casing unit about an axis of rotation;
    a first sliding bearing shell disposed on the casing unit, the first sliding bearing shell including a first circumferential radial projection that is configured to engage in the first circumferential groove of the steering shaft; and
    a second sliding bearing shell disposed on the casing unit, which is arranged axially spaced from the first sliding bearing shell and includes a second circumferential radial projection that engages in a second circumferential groove of the steering shaft,
    wherein on the casing unit, adjacent to the second sliding bearing shell, a bearing ring with a bearing section projecting inwardly is fastened, and a radial outside of the second sliding bearing shell lies against the casing unit with sliding fit and between the bearing section of the bearing ring and an axial lateral face of the second sliding bearing shell a compression spring is arranged, which is configured to axially preload the second sliding bearing shell relative to the first sliding bearing shell held on the casing unit.

2. The pivot bearing arrangement of claim 1, wherein the bearing ring is arranged on an axial side of the second sliding bearing shell facing the first sliding bearing shell, such that the compression spring biases the two sliding bearing shells apart.

3. The pivot bearing arrangement of claim 1, wherein the bearing ring is arranged on an axial side of the second sliding bearing shell facing away from the first sliding bearing shell, such that the compression spring biases the two sliding bearing shells towards one another.

4. The pivot bearing arrangement of claim 1, wherein the compression spring is a disk spring or a wave spring.

\* \* \* \* \*